United States Patent [19]

Ito et al.

[11] Patent Number: 4,490,753

[45] Date of Patent: Dec. 25, 1984

[54] AUDIO SIGNAL RECORDING AND REPRODUCING CIRCUIT

[75] Inventors: Shigeyuki Ito, Yokohama; Yoshizumi Watatani, Fujisawa, both of Japan

[73] Assignee: Hitachi, Ltd., Tokyo, Japan

[21] Appl. No.: 350,588

[22] Filed: Feb. 22, 1982

[30] Foreign Application Priority Data

Feb. 23, 1981 [JP] Japan .................................. 56-24314

[51] Int. Cl.³ ............................................ H04N 5/782
[52] U.S. Cl. .................................... 360/19.1; 358/343
[58] Field of Search ................ 360/19.1, 20; 358/341, 358/343

[56] References Cited

U.S. PATENT DOCUMENTS 3,830,968  8/1974  Redlich et al. .................. 358/343 X
3,911,476  10/1975  Keizer .............................. 358/343 X

FOREIGN PATENT DOCUMENTS 163613  12/1980  Japan ................................. 360/19.1
1113515  5/1968  United Kingdom ............... 360/19.1

*Primary Examiner*—Robert L. Richardson
*Attorney, Agent, or Firm*—Antonelli, Terry & Wands

[57] ABSTRACT

A helical scanning type video tape recorder is provided with an audio signal recording/reproducing circuit in which the audio signal is submitted to frequency modulation, after which the modulated audio signal is recorded on a video track by a rotary video head while a video signal is also recorded on the same track. This provides very good quality of reproduction of the audio signal. In order to reduce crosstalk interference of audio signals between adjacent tracks, a dynamic range of the audio signal is compressed to have a predetermined characteristic in the recording process, and then expanded to compensate to the original dynamic range in the reproducing process.

7 Claims, 7 Drawing Figures

AUDIO SIGNAL RECORDING AND REPRODUCING CIRCUIT

BACKGROUND OF THE INVENTION

The present invention relates to an apparatus for recording and reproducing video and audio signals, and more particularly to an audio signal recording and reproducing apparatus which is suitable for recording the audio signal superimposed upon the video signal on the same track.

A typical example of apparatus for recording and reproducing the video and audio signals is the well known video tape recorder. The video tape recorder is required to be compact and have a longer recording time for unit length of tape, i.e., enhancement of the recording density. The higher recording density can save the tape length, allowing the use of a small tape cassette, thus contributing to the compactness of the apparatus. The above-mentioned demands are particularly persistent for video tape recorders for home use.

In existing practical video tape recorders, the video signal and the audio signal are recorded and reproduced on separate tracks on the magnetic tape. That is, in common home use video tape recorders, the video signal is recorded and reproduced in 2-head helical scanning system in which two rotary heads are used to form recording tracks askew the longitudinal direction of the magnetic tape, while the audio signal is recorded using a fixed head on a track parallel to the longitudinal direction of the tape. The recording density of such video tape recorders have been improved significantly owing to advanced magnetic tape materials and recording system in which the two rotary heads are arranged to have different azimuth so as to eliminate the guard band between two skew tracks. The recording density has been enhanced by about 17 times in the last decade, resulting in a significant reduction of the tape speed.

In consequence, it becomes difficult for recording and reproducing the audio signal by the fixed head to obtain the satisfactory wow and flutter characteristics, signal-to-noise (S/N) ratio and frequency response. Therefore, current household video tape recorders, in general, have an inferior sound quality relative to that of audio tape recorders. Because visual information has the primary importance whereas audible information is of secondary importance in household video tape recorders, the requirement for the sound quality is not as servere as it is in the case of audio tape recorders, and no practical problem has arisen.

However, more compact video tape recorders compared with current ones are demanded, and a higher recording density is needed to fulfill the request. The need of a small tape cassette needs a further reduction of the tape speed, which can be slower than that of popularized audio tape recorders. Thus, it is difficult to obtain the satisfactory performance in practical meaning by the conventional method of recording and reproducing the audio signal using a fixed head.

SUMMARY OF THE INVENTION

It is an object of the present invention to achieve the high density recording and variable speed reproducing capabilities (a function to reproduce pictures in tape speeds different from the recording tape speed such as in reproducing slow-motion pictures, fast-motion pictures and a still picture), and also to provide a recording and reproducing circuit which can record and reproduce the audio signal in high quality, while being consistent with the miniaturization of the apparatus.

In order to achieve the object of the present invention, in recording the audio signal, the carrier wave has a frequency lower than the modulated video signal in order to occupy a frequency band lower than the modulated video signal recorded in normal frequency modulation. This carrier wave is operated on angular modulation such as frequency modulation, for example, and superimposed on the modulated video signal on the frequency multiplex basis so that the audio signal is recorded concurrently with the video signal on the same track. The audio signal is recorded with valid amplitude and frequency characteristics depending on the amplitude of the audio signal to be recorded and the valid characteristics are restored to the original characteristics when the signal is reproduced. An idea of superimposing the audio signal on the video signal and recording the signals on the same track has existed hitherto, but has not been realized due to various technical problems. That is, the conventional video tape recorder with a rotary head generally has recording tracks with a blank portion, i.e. a guard band, provided therebetween in order to prevent a crosstalk jamming caused by the adjacent tracks during the reproduction. However, in the recent household video tape recorder, the guard band is eliminated for the efficient use of the magnetic tape and a pair of rotary heads are arranged to have different azimuth angles for their gaps so as to counteract the inter-track crosstalk by utilization of the azimuth loss. The crosstalk reduction caused by the azimuth loss is not sufficient for the lower frequency range of the recording signal, as it is well known in the field of art. Therefore, in the current household video tape recorder, the chrominance subcarrier which is recorded after conversion into a lower frequency band cannot be rid of the crosstalk by utilization of the azimuth loss. Therefore, the recording is carried out by controlling the phase of the chrominance subcarrier in each track, and it is reproduced using a processing circuit including a delay line, by utilization of a strong correlation of color information between horizontal or vertical scanning periods. On the other hand, the audio signal does not have a periodic correlation as in color information and the inter-track cross-talk cannot be eliminated by the delay line processing circuit. According to the present invention, the luminance signal in the video signal is prevented from inter-track crosstalk by utilization of the azimuth loss and without provision of a guard band between two tracks so that the high density recording is retained, whereas the audio signal is prevented from crosstalk by varying the amplitude and/or frequency characteristics depending on the amplitude of the audio signal for superimposed recording with the modulated video signal and the reproduced audio signal is operated on the process for restoring the original characteristics. For example, the dynamic range of the audio signal is compressed in recording and it is subjected to the expanding process before reproduction so that the inter-track crosstalk is reduced.

According to the foregoing characteristic of the present invention, the inter-track crosstalk of the audio signal can be reduced not depending solely on the azimuth loss and the audio signal can be recorded in a lower frequency band, thus allowing the modulated video signal to have a lower frequency band by that extent. In consequence, a narrower frequency band suffices for recording, allowing a lower head speed relative to the magnetic tape, a small diameter for the rotary head, and thus a small diameter for the cylindrical tape guide for the rotary head. Thus, a compact video tape recorder using a small amount of tape is made possible. In addition, the crosstalk can further be reduced by processing the signal and therfore the recording track width relative to the head gap width can be made narrower, whereby the recording density can further be enhanced.

DESCRIPTION OF THE PREFERRED EMBODIMENT

The present invention will now be described by way of example where the audio signal in the form of a frequency modulated signal is recorded and reproduced.

Figure 1:
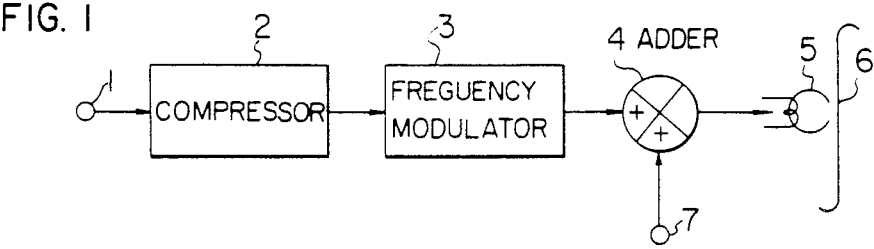
FIG. 1 shows an embodiment of the audio signal recording circuit according to the present invention.
Figure 2:
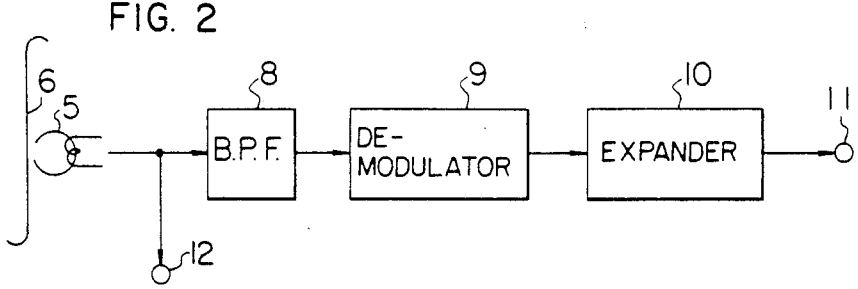
FIG. 2 shows an embodiment of the reproducing circuit according to the present invention.

FIG. 1 is a block diagram showing an embodiment of the audio signal recording circuit applicable to video tape recorders of the rotary head type in which the frequency modulated audio signal is multiplexed to the video signal for recording. FIG. 2 is a block diagram showing an embodiment of the audio signal reproducing circuit which reproduces the audio signal recorded on the magnetic tape by the circuit shown in FIG. 1. In FIGS. 1 and 2, the recording and reproducing processes for the video signal have the same principle as in the common household video tape recorder, and illustration and detailed description of the video signal processing circuit will be omitted.

This embodiment exemplifies the characteristic to be varied in accordance with the amplitude of the audio signal as the amplitude characteristic, i.e., the dynamic range of the audio signal is varied.

Figure 3:
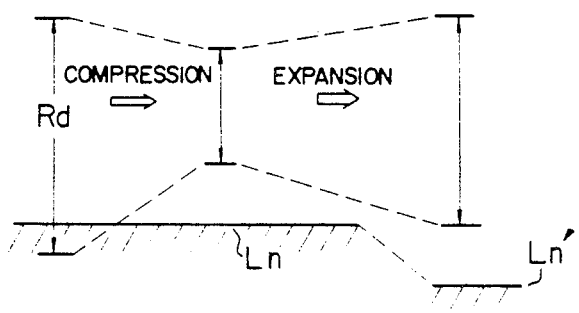
FIG. 3 is a graphical representation useful to explain the elimination of unnecessary signal components by the compression and expansion processes.
Figure 4:
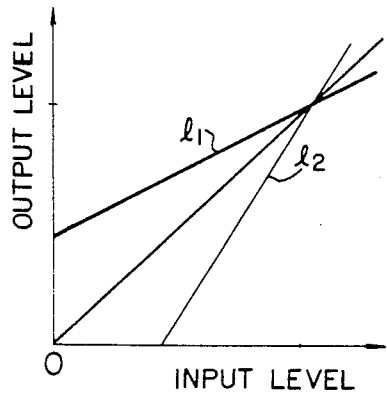
FIG. 4 is a graphical representation showing illustratively the input/output characteristics of the compression and expansion processes.

The audio signal entered through the input terminal 1 is processed by the $\frac{1}{2}$ compressing circuit 2 prior to recording so that the signal level of large amplitude portions decreases and the signal level of small amplitude portions increases as shown by the compression/expansion characteristics in FIG. 3. The compressing circuit 2 halves the dynamic range of the audio signal in accordance with the compression characteristic shown by line 11 in FIG. 4. In FIG. 3, Rd signifies the dynamic range of the audio signal and Ln signifies the noise level which may be introduced during recording of audio signal due to recording circuit characteristics.

The output of the $\frac{1}{2}$ compressing circuit 2 is modulated by the frequency modulator 3. The frequency modulator 3 operates at a carrier center frequency of about 1.3 MHz and a frequency deviation of about ±50 kHz. A small amplitude portion of the audio signal will have a larger frequency deviation as compared with the signal before passing through the $\frac{1}{2}$ compressing circuit 2 by the amount proportional to the increase of level by the $\frac{1}{2}$ compressing circuit 2. The output of the frequency modulator 3 is added to the video signal entered through the input terminal 7 and then recorded on the magnetic tape 6 by the magnetic head 5 which generally includes two rotary video heads.

The video signal supplied through the input terminal 7 is processed in the same way as in the common household video tape recorder such that the luminance signal is converted into a frequency modulation signal ahd the chrominance signal with subcarrier is converted into a lower frequency signal. At the same time the phase of the subcarrier is altered in synchronization with the horizontal or vertical scanning pulses in order to prevent the crosstalk with the adjacent tracks.

Figure 5:
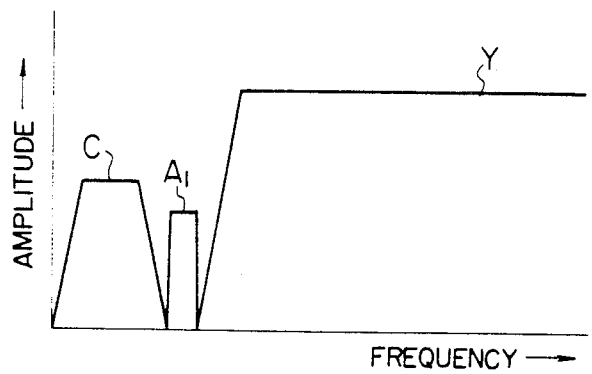
FIG. 5 is a graphical representation showing illustratively the frequency spectrum of the recording signal processed by the circuit of the present invention.

These audio and video signals to be recorded on the magnetic tape 6 may preferably have a frequency spectrum as shown, for example, in FIG. 5. As shown in the figure, the frequency band useful for recording is assigned such that the frequency modulated luminance signal Y is placed in the upper portion of the band and the frequency converted chrominance signal C is placed in the lower portion of the band with the frequency modulated audio signal Al placed therebetween. This arrangement can cause an increase of the inter-track crosstalk in reproduction due to the decreasing azimuth loss in the lower frequency range. Nevertheless, the reduction of the crosstalk by the effect of the azimuth loss can still be expected by allocating a frequency band as high as possible to the audio signal. The chrominance signal allocated with the lowest frequency range is rid of the crosstalk effectively by the process utilizing a strong correlation at each horizontal scanning interval, and no problem arises even if the azimuth loss does not serve to reduce the crosstalk for the chrominance signal.

Figure 6:
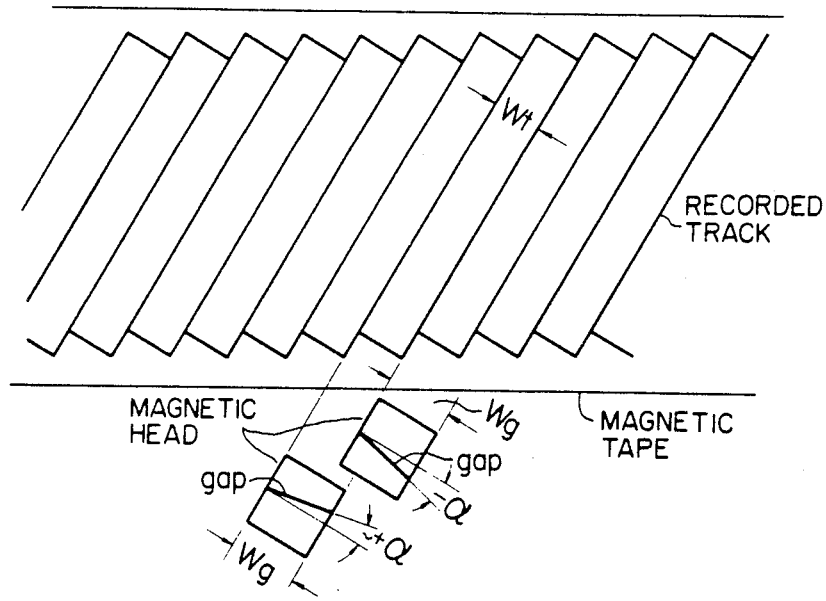
FIG. 6 is a diagram showing illustratively the spatial relationship between the recording track and the magnetic head on the magnetic tape.

The audio signal recorded together with the video signal in this way is reproduced by the circuit shown in FIG. 2. In the audio signal reproducing circuit of FIG. 2, a signal picked up on the magnetic tape 6 by the same magnetic head 5 as used in recording is fed to the bandpass filter (BPF) 8, which extracts the frequency modulated audio signal from the reproducion signal. The extracted FM audio signal is expected to include the desired FM audio signal against a jamming FM audio signal from the adjacent track in a ratio of around 22 dB on assumption that the magnetic head 5 has an azimuth angle ($\alpha$) of ±17°, a center frequency of 1.3 MHz, a recorded track width (Wt) of 18.5 $\mu$m and a video head gap width (Wg) of 25 $\mu$m. The spatial condition for the magnetic head and the recording track is shown in FIG. 6. With the video head gap width Wg being made about 1.5 times the recording track width Wt, an adequate signal level can be obtained in reading even if the head deviates from the track to some extent, thereby providing the reproduction signal with a satisfactory S/N ratio. In this case, the inter-track crosstalk may increase slightly, however, it can be reduced enough practically owing to the characteristic of the present invention. The wide head gap width Wg, as illustrated in the figure, eliminates the need of a severe accuracy of tracking, allowing a narrower recording track width Wt and thus the higher density recording. Such recording track narrower than the head gap width can be formed by determining the tape spedd so that the track pitch is shorter than the gap width.

The signal picked up by the magnetic head 5 is further fed through the output terminal 12 to a video signal reproduction circuit (not shown) so that the video signal is obtained by the signal processing known in the art. The extracted FM audio signal is demodulated into the audio signal by the FM demodulator 9. The demodulated audio signal still has the dynamic range halved in the recording process, and next the compressed dynamic range is expanded to the original range in accordance with the expansion characteristic shown by line 12 in FIG. 4.

The reproduced audio signal with its dynamic range restored to the original one comes to have a small noise level Ln' due to the same expanding operation as shown in FIG. 3, and is sent out through the output terminal 11 as a noise-suppressed signal.

Figure 7:
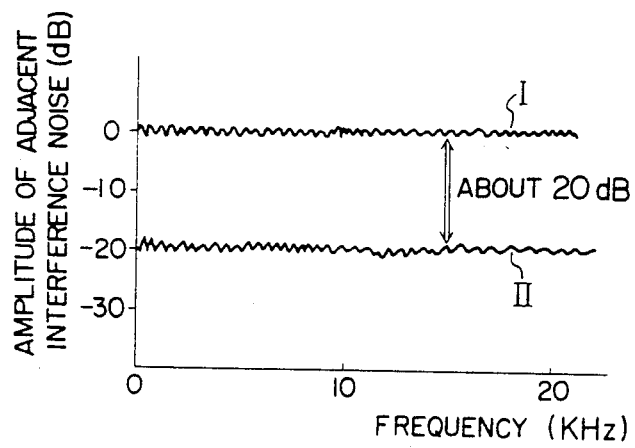
FIG. 7 is a graphical representation showing illustratively a test result useful to explain the effect of the present invention.

FIG. 7 shows illustratively the frequency spectrum of the inter-track jamming noise observed when the FM audio signal is reproduced by the arrangement of the foregoing embodiment with and without the crosstalk eliminating means which comprises the ½ compressing circuit 2 and the 2-fold expanding circuit 10. In the figure, the amplitude indicated by I is the case without the crosstalk eliminating means, while amplitude II is the case with that means. As can be seen from FIG. 7, use of the foregoing embodiment can reduce the inter-track jamming by approximately 20 dB.

The crosstalk eliminating means described in the foregoing embodiment does not vary the frequency response of the amplitude in recording, but merely performs the compression and expansion for the dynamic range. It should be noted that another arrangement which operates to eliminate the crosstalk in conjunction with a function of varying the frequency response of the amplitude may also be employed. It is also possible to employ for the present invention an arrangement which operates to eliminate the crosstalk by varying the frequency response of the amplitude depending on the signal level at a specific frequency band of the audio signal at the time of recording.

Such arrangment for varying the frequency response can be achieved, for example, as follows.

The compressor 2 is a circuit which detects the input signal level and varies its gain in response to the signal level. This operation is generally independent of the frequency of the input signal. When the circuit is arranged to detect the signal level after it has been conducted through a high-pass filter or a band-pass filter, it is possible to vary the frequency response of the amplitude depending on the signal level or to change the frequency response of the amplitude depending on the signal level at a specific frequency. Variation of both the amplitude and the frequency response of the amplitude can be achieved by carrying out a gain control in detecting the input signal level by use of a means which serves irrespective to the frequency and a means which detects the signal level at the output of the filter.

In the circuit of FIG. 1, a pre-emphasis circuit may be provided at the front of the compressing circuit 2, and a de-emphasis circuit may be provided at the end of the expansion circuit 10 in FIG. 2. It is effective to prevent the overmodulation when the pre-emphasis is carried out before compression of the dynamic range which effectively increases the frequency deviation.

We claim:

1. An audio signal recording and reproducing system which records an audio signal on a magnetic tape by superimposing it to a video signal and which reproduces the audio signal comprising:

means for compressing an original dynamic range of said audio signal in a predetermined frequency band to thereby output an audio signal having a compressed dynamic range;

means for angle-modulating a carrier signal with an output signal of said means for compressing to produce an angle-modulated audio signal, said carrier signal having a lower frequency than a frequency band of a modulated video signal to be recorded;

means for recording said angle-modulated audio signal on said magnetic tape by superimposing it to said modulated video signal;

reproducing means for picking up and demodulating said angle-modulated audio signal recorded on said magnetic tape; and means for expanding a dynamic range of the audio signal demodulated by said reproducing means so as to make said audio signal have the original dynamic range.

2. An audio signal recording and reproducing system according to claim 1, wherein said means for angle-modulating includes a modulator having means for frequency-modulating said carrier signal by said output signal of said means for compressing.

3. An audio signal recording and reproducing system according to claim 1, wherein said means for angle-modulating includes a modulator having a occupied frequency bandwidth between frequency bands of a modulated luminance signal and a chrominance signal which has been converted to a frequency band lower than the frequency band of said luminance signal.

4. An audio signal recording and reproducing system according to claim 1, 2 or 3, wherein said means for compressing includes means for pre-emphasizing an audio signal to be recorded, and then compressing a dynamic range of the pre-emphasized audio signal, and said means for expanding includes means for de-emphasizing said audio signal expanded in its dynamic range.

5. An audio signal reproducing device for reproducing an audio signal which has been superimposed on a magnetic tape with a video signal, wherein said audio signal has been compressed from an original dynamic range in a predetermined frequency band to thereby output an audio signal having a compressed dynamic range, wherein a carrier signal has been angle-modulated with the compressed audio output signal to produce an angle-modulated audio signal, said carrier signal having a lower frequency than a frequency band of a modulated video signal to be recorded, and wherein said angle-modulated audio signal has been recorded on said magnetic tape by superimposing it to said modulated video signal, said audio signal reproducing device comprising;

reproducing means for picking up and demodulating said angle-modulated signal recorded on said magnetic tape; and means for expanding a dynamic range of the audio signal demodulated by said reproducing means so as to make said audio signal have the original dynamic range.

6. An audio signal reproducing device according to claim 5, wherein said means for expanding includes means for de-emphasizing said audio signal expanded in its dynamic range.

7. An audio signal recording circuit which records an audio signal on a magnetic tape by superimposing it to a video signal, comprising:

means for compressing an original dynamic range of said audio signal in a predetermined frequency band to thereby output an audio signal having a compressed dynamic range;

menas for angle-modulating a carrier signal with an output signal of said means for compressing to produce an angle-modulated audio signal, said carrier signal having a lower frequency than a frequency band of a modulated video signal to be recorded; and means for recording said angle-modulated audio signal on said magnetic tape by superimposing it to said modulated video signal.

* * * * *